United States Patent
Ramsay et al.

(10) Patent No.: US 11,060,391 B2
(45) Date of Patent: Jul. 13, 2021

(54) IMAGE BASED ROCK PROPERTY TENSOR VISUALIZATION OF A GEOCELLULAR GRID IN A DYNAMIC 3D ENVIRONMENT

(71) Applicant: LANDMARK GRAPHICS CORPORATION, Houston, TX (US)

(72) Inventors: Travis St. George Ramsay, Hockley, TX (US); Burns Boaz, Richmond, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 382 days.

(21) Appl. No.: 15/759,805

(22) PCT Filed: Dec. 22, 2015

(86) PCT No.: PCT/US2015/067513
§ 371 (c)(1),
(2) Date: Mar. 13, 2018

(87) PCT Pub. No.: WO2017/111966
PCT Pub. Date: Jun. 29, 2017

(65) Prior Publication Data
US 2019/0195061 A1    Jun. 27, 2019

(51) Int. Cl.
*E21B 47/002*    (2012.01)
*G01V 1/30*    (2006.01)
(Continued)

(52) U.S. Cl.
CPC ............ *E21B 47/002* (2020.05); *G01V 1/306* (2013.01); *G01V 8/02* (2013.01); *G01V 99/005* (2013.01); *G06T 17/05* (2013.01); *E21B 25/00* (2013.01)

(58) Field of Classification Search
CPC .......... G01V 1/306; G01V 8/02; G06T 17/05; E21B 47/0002; E21B 25/00
See application file for complete search history.

(56) References Cited

U.S. PATENT DOCUMENTS

| 2009/0110242 A1 | 4/2009 | Touati et al. |
| 2009/0116697 A1* | 5/2009 | Shalaby ................... G01B 5/28 382/108 |

(Continued)

FOREIGN PATENT DOCUMENTS

| WO | WO 2009/126881 A2 | 10/2009 |
| WO | WO-2010/063570 A1 | 6/2010 |

(Continued)

OTHER PUBLICATIONS

Supplementary Search Report issued for European Patent Application No. 15911644 dated Jul. 16, 2019, 6 pages.

(Continued)

*Primary Examiner* — Chuen-Meei Gan

(57) ABSTRACT

A visualization module of an imaging system having a 3D geocellular model generated for illustrating rock types within a subterranean formation. The visualization module can determine that cells of the 3D geocellular model are visible to a field of view for a viewing user. For each cell determined to be visible, the visualization module can determine a rock type for the cell and that one or more faces of the cell are visible. For each face determined to be visible, the visualization module can determine an orientation of the face; determine that an image corresponds to the determined orientation and determined rock type; and apply the image to the face of the cell in the 3D geocellular model.

18 Claims, 6 Drawing Sheets

(51) Int. Cl.
  *G01V 8/02* (2006.01)
  *G01V 99/00* (2009.01)
  *G06T 17/05* (2011.01)
  *E21B 25/00* (2006.01)

(56) References Cited

U.S. PATENT DOCUMENTS

| | | | | |
|---|---|---|---|---|
| 2009/0259446 | A1* | 10/2009 | Zhang | E21B 47/00 703/2 |
| 2009/0262603 | A1* | 10/2009 | Hurley | G01V 11/00 367/86 |
| 2010/0085357 | A1* | 4/2010 | Sullivan | G06T 15/06 345/420 |
| 2011/0066404 | A1* | 3/2011 | Salazar-Tio | G01V 11/00 703/1 |
| 2011/0074766 | A1* | 3/2011 | Page | G06T 17/05 345/419 |
| 2012/0221306 | A1* | 8/2012 | Hurley | G01V 99/005 703/6 |
| 2012/0239361 | A1* | 9/2012 | Vargas-Guzman | G06T 17/05 703/6 |
| 2014/0149041 | A1* | 5/2014 | Sung | G01V 99/005 702/11 |
| 2014/0236559 | A1 | 8/2014 | Fung et al. | |
| 2016/0202390 | A1* | 7/2016 | Ramsay | G01V 99/005 703/6 |
| 2017/0298714 | A1* | 10/2017 | Ferreira | E21B 43/16 |
| 2018/0253514 | A1* | 9/2018 | Bryant | G06F 30/20 |

FOREIGN PATENT DOCUMENTS

| | | |
|---|---|---|
| WO | WO 2012/118866 A2 | 9/2012 |
| WO | WO-2012118864 A2 | 9/2012 |
| WO | WO 2015/050530 A1 | 4/2015 |
| WO | WO-2015/099563 A1 | 7/2015 |

OTHER PUBLICATIONS

Canadian Intellectual Property Office, Application No. 3,006,868, Examiner's Letter, dated Mar. 26, 2019, 7 pages, Canada.
International Search Report and Written Opinion from PCT/US2015/067513, dated Aug. 24, 2016, 9 pages.

* cited by examiner

IMAGE BASED ROCK PROPERTY TENSOR VISUALIZATION OF A GEOCELLULAR GRID IN A DYNAMIC 3D ENVIRONMENT

BACKGROUND

For many years, geologists in the oil and gas exploration industry have taken and analyzed rock samples of potential hydrocarbon-producing subterranean formations as part of their efforts to determine the profitability of completing wells from which the core samples are taken, as well as the desirability of further exploratory drilling in the same area. Once a formation of interest is reached in a drilled well, drillers often investigate the formation and the deposits therein by obtaining and analyzing such samples. Each representative sample is generally cored from the formation using a hollow coring bit, and the sample obtained using this method is generally referred to as a core sample.

Once the core sample has been transported to the surface, it may be analyzed to assess, among other purposes, the reservoir storage capacity (porosity), the flow potential (permeability) of the rock material that makes up the formation, the chemical and mineral composition of the mineral deposits residing in the pores of the formation, and the irreducible water content of the rock material. The information gleaned from analysis of the sample is used to design and implement well completion; that is, to selectively produce certain economically attractive treatment intervals from among those accessible by the well. Upon deciding on a well completion plan, all intervals except those specifically targeted for production are isolated from the target interval, and the deposits within the targeted interval are selectively produced through the well.

During reservoir development for the extraction of hydrocarbons, a variety of characterizing techniques are used to provide visualization of the relevant subterranean formations that aid in making asset management decisions. Often, subterranean formations exhibit great complexity, and operators use seismic surveys, well logs, cores, etc. for ways to map subsurface formations. Geocellular models use grids to construct a static model of the reservoir containing petrophysical, geological, geophysical, fluid, and rock data as spatially distributed throughout the reservoir. While early generations of mapping technology yielded 2D maps of the complex 3D environment, three-dimensional models have since been developed to provide a more accurate and detailed view of the subterranean formation. Modern technology creates high-resolution geological models built upon 3D cell-based meshes that provide the architecture for building a structural stratigraphic framework. Models are constructed using software products that allow geoscientists to approximate the static state of reservoir by interpolating or simulating geologic facies and their petrophysical properties within a 3D space.

The visualization of modeling output as previously known generally consists of using gradational or discrete color maps to demonstrate transitions in properties of the surrounding subterranean formations according to disparate color schemes (sequential, diverging and qualitative). However, such color-based models do not relate to the reality of subterranean formation, and must be interpreted by reference to the arbitrary assignment of colors and patterns used in each model.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
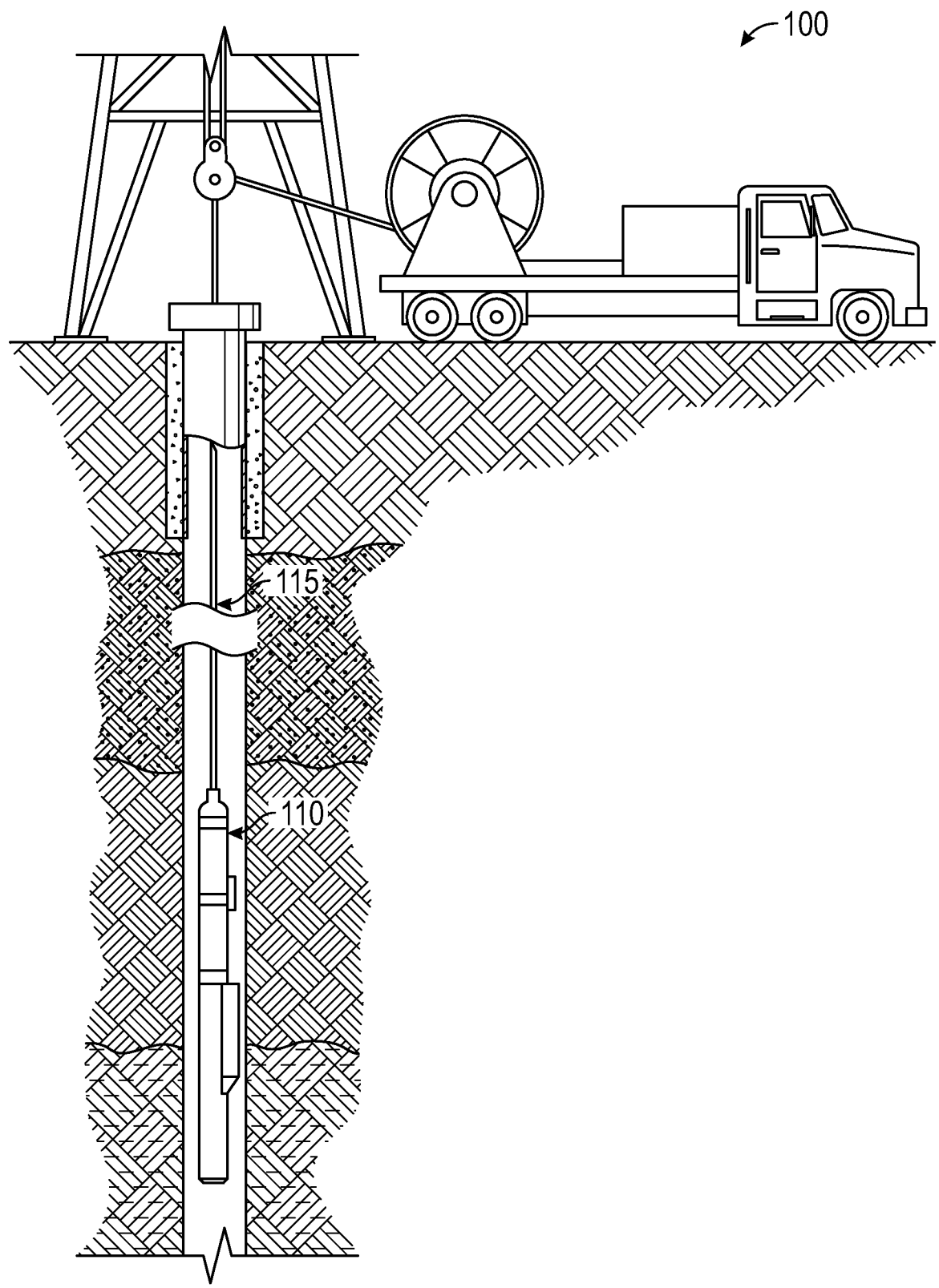
FIG. 1 illustrates an example of wireline implementation of the present disclosure.

The present disclosure relates to the collection of core samples and, more particularly, to image based rock property tensor visualization of a geocellular grid in a dynamic 3D environment.

The embodiments described herein discuss providing a dynamic 3D environment for visualization of a core sample collection, as well as providing image based rock property tensor visualization of a geocellular grid. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented in which the coring tool is made suitable for testing, retrieval and sampling along sections of the formation. Embodiments may be implemented with various samplers that, for example, may be conveyed through flow passage in tubular string or conveyance, such as using a wireline, slickline, coiled tubing, downhole robot (tractor), or the like. The system described herein may be suited for use with the Hostile Rotary Sidewall Coring Tool (HRSCT-B) available from Halliburton Energy Services of Houston, Tex., for example. One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

The standard illustration of petrophysical rock characterization arrays (e.g., depositional facies, hydraulic rock types, petrofacies, etc.) on the geocellular grid in the 3D visualization environment has led to the interpretation of rock properties in oil and gas industry visualization packages as a collection of colors that do not directly resemble the rock they are used to describe. Instead, the software application practitioner must interpret changes in accent or hue as changes to the property being analyzed. While this is beneficial for quantitative assessment of property variation, it does not provide an adequate combined qualitative and quantitative means of evaluation of a 3D geocellular model in terms of the actual appearance of the subterranean formation being modeled.

The present disclosure provides for a combined qualitative and quantitative expression of a 3D rock property characterization based on textured images or computerized tomography (CT) images of rocks being represented in the 3D geocellular model, referred to as a geocellular grid. Instead of coloring the petrophysical rock characterization array according to a single accent or hue following a color map scheme, each cell of the 3D geocellular model is described by an oriented image of the characterized rock. CT, or other imaging techniques, may be performed on sections of cores taken form a subterranean formation of interest with a known orientation during scanning and reconstruction such that the configuration of x, y and z axes are maintained from the wellbore. Such oriented images can be applied to image faces of the geocellular grid that are of common orientation to illustrate characterized tensors; or as an alternative, disparate textured images can be applied to the faces of the geocellular grid in order to describe tensor related variation of properties.

In some aspects, the subject system includes a downhole device, such as a coring tool, configured to extract a core sample from a formation and to provide the core sample to a surface. Once the core, having a known subterranean orientation is acquired, computerized tomography can be used to capture a set of images of the core sample at the surface, in which each image of the set of images includes a representation of the x, y, and z facies of the core sample. The images obtained from computerized tomography can be further analyzed to construct a representation visualization of one or more rock types within the formation.

In one or more implementations, the visualization module includes a computer-readable medium comprising instructions for executing relevant software functions that, when executed by a computer, cause the computer to execute operations for the visualization of the 3D geocellular model. In this respect, the visualization module may be configured to determine that one or more cells of the 3D geocellular model are visible to a field of view for a viewing user. For each of the one or more cells determined to be visible, the visualization module may be configured to determine that one or more faces of the visible cell are visible to the field of view. For each of the one or more faces determined to be visible, the visualization module may be configured to determine an orientation of the face. The visualization module may be configured to determine that an image of the set of images corresponds to the determined orientation and determined rock type for the cell. The visualization module may be configured to apply the texture image to the face of the cell in the 3D geocellular model.

Thus, the actual display of the 3D geocellular model illustrating the characterized rock will directly resemble an actual subsurface rock formation instead of a color map interpretation that is not explicitly representative of the rock it is intended to describe. In this regard, the subject disclosure will permit greater interpretive capabilities of the subsurface description beyond the rudimentary use of petrophysical property representation by generalized, unrelatable color schemes. Once incorporated into an asset characterization and management workflow, the subject disclosure will allow the practitioner to infer the sequence of rock type associated with whole cores to be pulled from a wellbore before the core is pulled. In other words, the subject disclosure provides for the prediction of the wellbore core appearance to be performed a priori to drilling and coring. This will allow for increased efficiency in core acquisition planning from wellbores as core acquisition can be planned more thoroughly based on predictive analysis of cores that can be pulled from new/planned wellbores. In addition, rock type geomodel validation may be achievable as a result of real-time coring.

FIG. 1 shows an example system 100 that may employ the principles of the present disclosure. In FIG. 1, a coring tool 110 is placed in a wellbore by a wireline 115. In certain example embodiments, the coring tool 110 is placed in the wellbore by any conveyance, such as those discussed above (e.g., wired coil tubing) that is connectable to the surface. In other embodiments, the coring tool 110 may be placed in the wellbore as part of a measurement while drilling (MWD) portion of a drill string or as part of a logging while drilling (LWD) portion of a drill string. In yet other embodiments, the coring tool 110 may be coupled to drill pipe as part of a wired drill pipe system.

In one or more implementations, the coring tool 110 includes a coring drill bit for extracting a core sample from a subterranean formation such that the core sample may be visually analyzed once brought to the surface. In some embodiments, the analysis may be performed using an X-ray CT device. In some aspects, the X-ray CT sensor may be, or may be a part of, an image collection device for acquiring images of porous media in orthogonal directions of a geocellular grid in a dynamic multi-dimensional environment. Wellbore image data can also be used an alternative source of subsurface image data for visualization in the 3D geocellular grid.

Once the core is at the surface, standard imaging technology can be used with the extracted core sample to capture a set of images of the sample in multiple tomographic planes. In some aspects, the visualization module may be, used as part of a process for depicting captured X-ray computed tomography (CT) images of the extracted core sample.

It should be noted that while FIG. 1 generally depicts a land-based coring assembly, those skilled in the art will readily recognize that the principles described herein are equally applicable to subsea reservoir development operations that employ floating or sea-based platforms and rigs, without departing from the scope of the disclosure.

Figure 2:
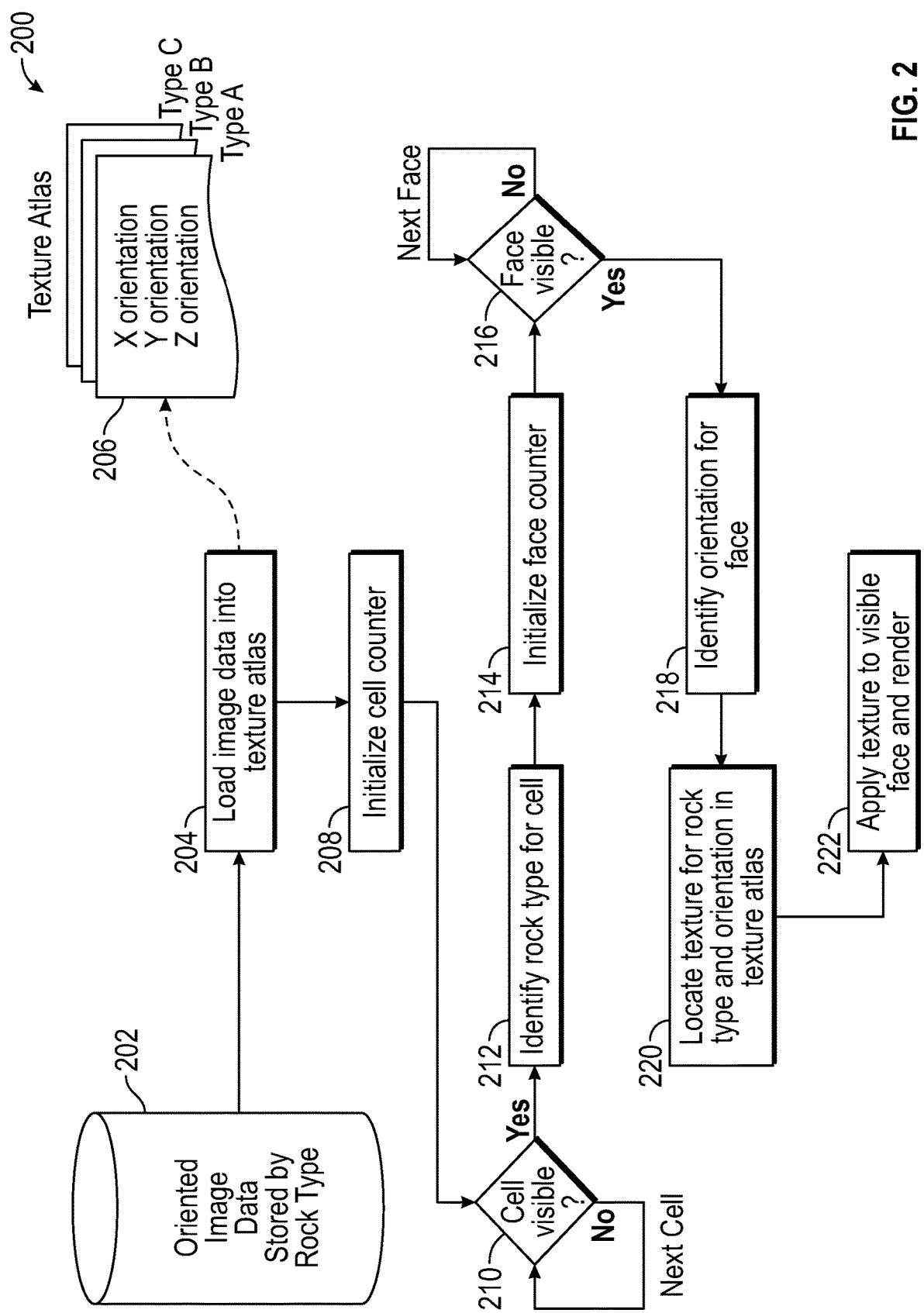
FIG. 2 is a flow chart of an exemplary process for image based rock property tensor visualization in accordance with one or more implementations of the present disclosure.

FIG. 2 is a flowchart of an exemplary process for image based rock property tensor visualization using an exemplary downhole system in accordance with one or more embodiments of the present disclosure. For explanatory purposes, the exemplary process 200 is described herein with reference to the system 100 of FIG. 1; however, the example process 200 is not limited to the system 100 of FIG. 1, and the exemplary process 200 may be performed by one or more components of the system 100, such as the coring tool 110 and/or the visualization module. Further, for explanatory purposes, the blocks of the exemplary process 200 are described herein as occurring in serial, or linearly. However, multiple blocks of the example process 200 may occur in parallel. In addition, the blocks of the exemplary process 200 need not be performed in the order shown and/or one or more of the blocks of the exemplary process 200 need not be performed.

In one or more implementations, oriented image data is stored in an image repository 202 by rock type such that a collection of images is categorized by rock type. The image data may represent a set of images for a characterized rock of a certain rock type captured in a certain direction (or orientation). The characterized rock may be a core sample extracted from a wellbore. The core sample may be partitioned into one or more layers at the surface such that an image is captured for each layer of the core sample. In this respect, each image of the set of images may include a representation of at least a cross-section of the core sample. Each image has an orientation configuration that corresponds to a coordinate within the wellbore, thereby maintaining the x-, y-, and z-axes of the characterized rock from the wellbore. In some aspects, the image data includes a representation of a pattern such as a texture corresponding to a rock type, where each rock type may correspond to a different texture. In other aspects, the image data includes a representation of a scanned characterized rock that is CT derived.

In one or more implementations, the image repository 202 stores images for each cell of a 3D rock property characterization. The mapping between images and cells may not be one-to-one. The characterization provides a spatial representation of rock property types in a targeted region of a wellbore. Typically, 3D geocellular models have cell counts in the range of $1\times10^5$ to $5\times10^8$. The 3D geocellular model may include less than $1\times10^5$ cells or include greater than $5\times10^8$ cells depending on implementation. The image repository 202 may store an image for each face of a cell even if the one or more faces of that cell are not visible to a field of view for a viewing user. Each image from the CT scans of the core sample can be depth registered and spatially oriented. In some embodiments, the image repository 202 is a data structure in memory communicably coupled to the visualization module that executes software functions relevant to the visualization of the 3D geocellular model.

The process at step 204 causes the stored image data to be loaded into a texture atlas 206. In some aspects, the texture atlas 206 is a data structure containing information about the orientation configuration of each image in the image repository. The orientation configuration may refer to the x-axis orientation, y-axis orientation and z-axis orientation of the image. In cases of an anisotropic visual display, the image is oriented in the direction that the image is intended to describe. However, in cases of an isotropic visual display, the image is the same irrespective of the orientation. In some embodiments, the texture atlas 206 includes at least one document for a corresponding rock type. For each document, each image corresponding to the rock type is listed with an index value. The index value provides a methodology to map images on a document to their corresponding cell faces within the 3D geocellular model. The texture atlas 206 may include a set of documents, where each document in the set of documents corresponds to a different rock type (e.g., Type A, Type B, Type C, etc.). The number of documents associated with the texture atlas may vary depending on the amount of rock types identified in the texture atlas.

The process at step 208 causes a cell counter to be initialized in order to initiate a recursive flow through the subject 3D geocellular model. The cell counter refers to the number of cells in a given model. For example, if there are 100 cells for a model, then the counter is configured to be initialized to zero and increment up to 99 (or up to 100 if initialized to one). The cell counter may increment irrespective of the direction (or path) taken through the model. For example, the cell counter may increment for contiguous cells or non-contiguous cells. The target core may be a prediction of the rock properties present within a corresponding cross-section of the wellbore. In some aspects, the target core corresponds to a characterized rock within the wellbore (e.g., extracted core sample) such that the target core is used to map the rock properties in surrounding (or neighboring) portions of the wellbore relative to the characterized rock.

The process at step 210 causes a determination to be made as to whether a first cell is visible to a field of view for a viewing user. In determining whether the cell is visible, the process 200 may include the step of determining whether the cell has at least one face located on a plane visible to a user. For example, a perspective view of the 3D geocellular model can have at least three sides located on respective planes (e.g., x-plane, y-plane, z-plane) facing within a field of view of a display to a user. In this regard, at least one cell of the model would be determined to be visible. The process causes a determination that one or more cells of the 3D geocellular model are located within the field of view for the viewing user, and that at least one cell of the model has at least one visible. In this respect, the cell can be characterized as visible. In determining that the cell is visible, the process 200 proceeds to step 212. Otherwise, the process causes a determination to be made as to whether a next cell in the model is visible. The next cell may be the next adjacently located cell along the x-axis, y-axis or z-axis depending on implementation.

The process at step 212 causes the rock type for the given cell to be identified. In identifying the rock type, the process 200 may include a step of determining the rock type corresponding to the cell location within the 3D geocellular model by predicting the rock type expected to correspond to that cell location. In this regard, the step 212 may be part of a predictive analysis in determining rock properties of a targeted location (or region) in the wellbore using a priori information. The a priori information may refer to information obtained from a prior core sample extracted from a location within or in proximity to the targeted region in the same wellbore or a different wellbore with similar rock properties. In other aspects, the process 200 includes the step of applying the rock type corresponding to a known core sample, in which the 3D geocellular model may be generated as part of generating a predictive model for subsequent image based visualization flows.

The process at step 214 causes a face counter to be initialized for a given cell determined to be visible. For example, if there are 6 faces for a cell, then the counter is configured to be initialized to zero and increment up to 5 (or up to 6 if initialized to one). The face counter may increment irrespective of the direction (or path) taken through the cell. For example, the cell counter may increment for contiguous faces or non-contiguous faces.

The process at step 216 causes a determination to be made as to whether a first face of the cell is visible to the field of view for the viewing user. If the face is determined to be visible, the process 200 proceeds to step 218. Similar to step 210, the process 200 may include the step of determining whether the cell has at least one face located on a plane visible to a user. Otherwise, the process causes a determination to be made as to whether a next face in the cell is visible. This step may be recursive up to the end of the face counter (e.g., when face counter reaches the total number of faces in the cell).

The process at step 218 causes an orientation of the visible face to be identified. In identifying the orientation, the process 200 may include the step of determining the direction that the face corresponds to on the cell (or within the 3D geocellular model). For example, a bottom-facing face may correspond to a downward vertical direction (e.g., negative y-axis value). In this example, the orientation for the visible face may be represented as (0, −y, 0), where y is an integer. Similarly, a forward-facing face may correspond to a frontward horizontal direction (e.g., positive z-axis value). In this example, the orientation for the visible face may be represented as (0, 0, +z), where z is an integer.

The process at step 220 causes the texture atlas to be indexed to locate image data corresponding to the texture for the identified rock type and identified orientation. In this embodiment, the identified rock type may correspond to at least one document containing images for that rock type. The identified orientation information may be used to index the document for locating an image of the identified rock type having a representation of a characterized rock in the same orientation configuration or at least substantially the same orientation configuration. In cases where the image includes a representation of a characterized rock with a close resemblance to the identified rock type and identified orientation, the process causes selection of the image if the differences are within a predetermined threshold variance. The predetermined threshold variance may be variable, and dependent on user discrimination. In some aspects, the image data is located by comparing the determined orientation of the face (referred to as the identified orientation information) against orientation information contained in the texture atlas 206 to determine a match. In this respect, the located image may be applied to the visible face based on the determined match (see step 222).

The process at step 222 causes the located image data with the matching texture and orientation to be applied to the visible face of the cell. The process then causes a rendering of the applied image data for display to a user. The process 200 continues to the next face in the cell following step 222. The process 200 continues to the next cell in the 3D geocellular model if there are no remaining visible faces in the current cell that need image data applied.

Figure 3:
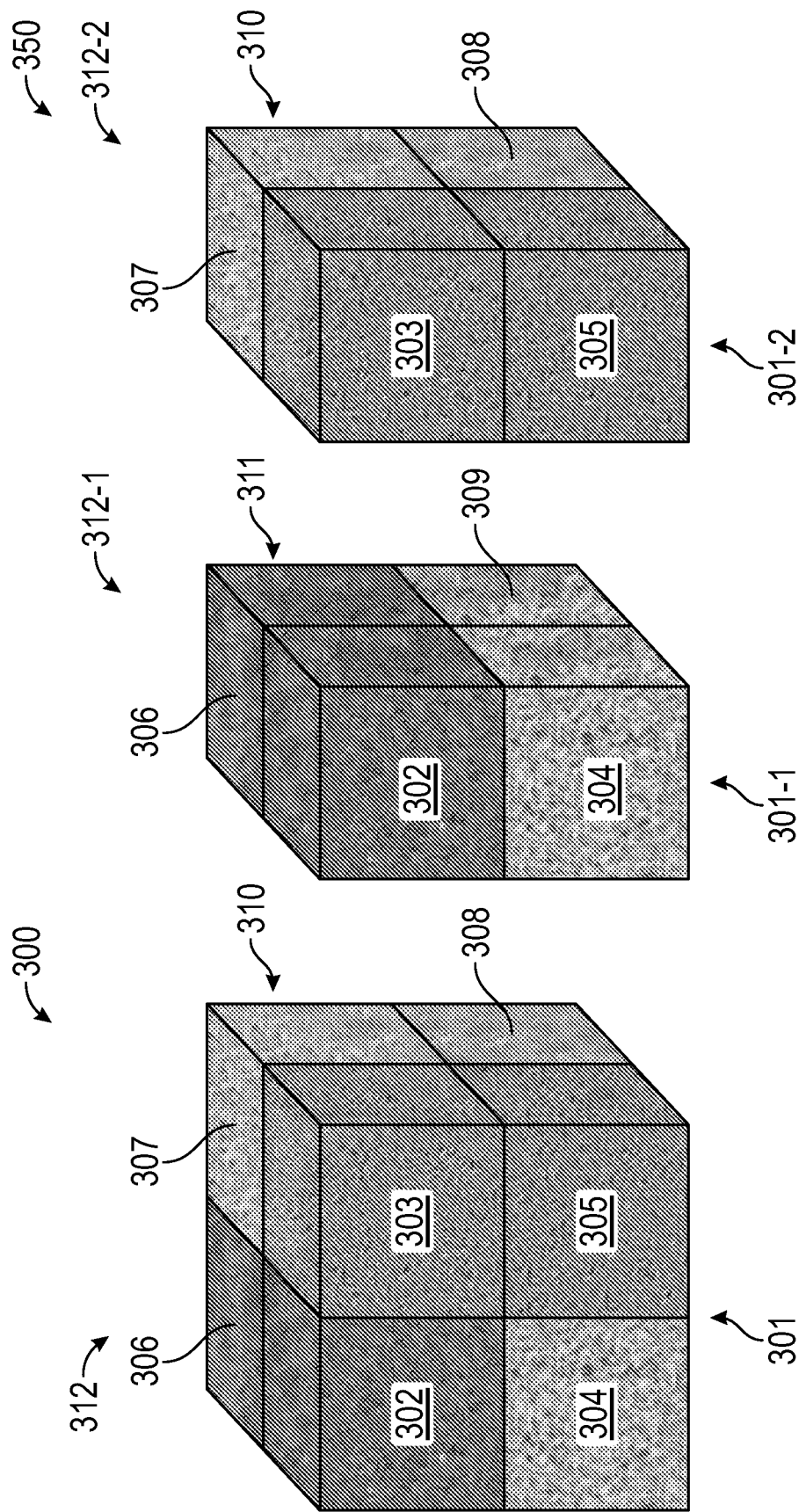
FIG. 3 illustrates an example of isotropic rock type geocellular grid including a slice section of the geocellular grid in accordance with one or more implementations of the present disclosure.

FIG. 3 illustrates an example of isotropic rock type geocellular grid 300 including a slice section 350 of the geocellular grid in accordance with one or more implementations of the present disclosure. As shown in FIG. 3, the rock types are described by the same texture in all directions; hence an isotropic visual display. This would be exclusively applicable to isotropic descriptions of rock type. Each rock type described by a different image is isotropic and is described by the same rock type image in all directions. The geocellular grid 300 may be displayed with the same texture or image but any image (including CT derived images) may be used depending on implementation.

The isotropic rock type geocellular grid 300 includes cells 302-309 arranged in a cube configuration (e.g., 2×2×2). The cells 302-305 include respective first faces located on a side 301. The side 301 is facing in a forward-horizontal direction (e.g., +z axis). The cells 303, 305, 307 and 308 include respective second faces located on a side 310. The side 310 is facing in a rightward-horizontal direction (e.g., +x axis). The cells 302, 303, 306 and 307 include respective third faces located on a side 312. The side 312 is facing in an upward-vertical direction (e.g., +y axis). In this embodiment, a texture may be applied to each face located on the sides 301, 310 and 312, which are located in a field of view of a display visible to a user. The texture may be the same for each visible face to provide an isotropic visual display of the geocellular grid 300.

In this embodiment, the cells 302 and 306 correspond to a first rock type, the cells 303 and 305 correspond to a second rock type, and the cells 304, 307, 308 and 309 correspond to a third rock type. In this regard, the same texture representing the first rock type is applied to the cells 302 and 306, the same texture representing the second rock type is applied to the cells 303 and 305, and the same texture representing the third rock type is applied to the cells 304, 307, 308 and 309.

A slice section 350 of the isotropic rock type geocellular grid 300 is produced to illustrate the internal structure of the geocellular grid 300 and revealing the isotropic characteristics of the grid. The slice section 350 illustrates the same cells 302-309 but now an internal side 311 is revealed to expose respective fourth faces of the cells 302, 304, 306 and 309. The side 311 is facing in a similar direction as that of side 310. The slice section 350 includes a first slice with visible sides 301-1, 312-1 and 311, and a second slice with visible sides 301-2, 312-2 and 310.

In operation, the images of the geocellular grid 300 are stored in the image repository 202, and the stored images are mapped to the 3D geocellular model 300 such that the same image is displayed on each face of the cells pertaining to the geocellular grid 300.

Figure 4:
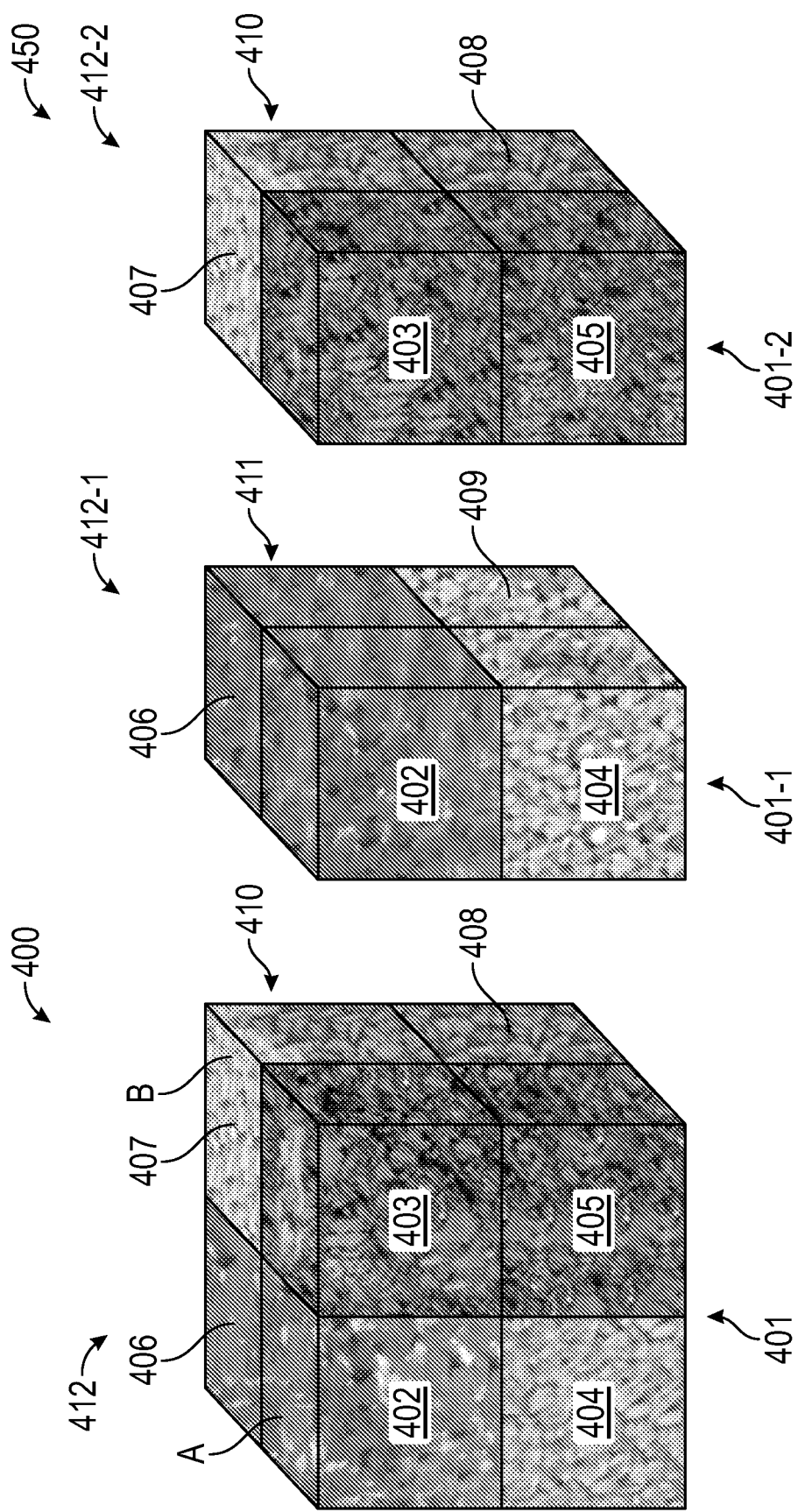
FIG. 4 illustrates an example of anisotropic rock type geocellular grid including a slice section of the geocellular grid in accordance with one or more implementations of the present disclosure.

FIG. 4 illustrates an example of anisotropic rock type geocellular grid including a slice section of the geocellular grid in accordance with one or more implementations of the present disclosure. In the case of anisotropic rock properties/images, the images from the whole core are oriented and registered according to the direction that they describe. As shown in FIG. 4, the rock types are described by the different images on each face of the grid. The display of the oriented image of the core occupies the entire cell face. Once registered in the image repository 202 and assigned to a rock type index using the texture atlas 206, each image of the grid 400 would be displayed on the appropriate cell face.

The anisotropic rock type geocellular grid 400 includes cells 402-409 arranged in a cube configuration (e.g., 2×2×2). The cells 402-405 include respective first faces located on a side 401. The side 401 is facing in a forward-horizontal direction (e.g., +z axis). The cells 403, 405, 407 and 408 include respective second faces located on a side 410. The side 410 is facing in a rightward-horizontal direction (e.g., +x axis). The cells 402, 403, 406 and 407 include respective third faces located on a side 412. The side 412 is facing in an upward-vertical direction (e.g., +y axis). In this embodiment, an actual image of a characterized rock having a particular orientation may be applied to a corresponding face located on the sides 401, 410 and 412, which are located in a field of view for a viewing user. In some aspects, the images are oriented about a vertical axis (e.g., images in cell 402 oriented about axis A, images in cell 407 oriented about axis B).

In this embodiment, the cells 402 and 406 correspond to a first rock type, the cells 403 and 405 correspond to a second rock type, and the cells 404, 407, 408 and 409 correspond to a third rock type. In this regard, images representing the first rock type are respectively applied to the cells 402 and 406, images representing the second rock type are respectively applied to the cells 403 and 405, and images representing the third rock type are respectively applied to the cells 404, 407, 408 and 409.

A slice section 450 of the anisotropic rock type geocellular grid 400 is produced to illustrate the internal structure of the geocellular grid 400 and revealing the anisotropic characteristics of the grid. The slice section 450 illustrates the same cells 402-409 but now an internal side 411 is revealed to expose respective fourth faces of the cells 402, 404, 406 and 409. The side 411 is facing in a similar direction as that of side 410. The slice section 450 includes a first slice with visible sides 401-1, 412-1 and 411, and a second slice with visible sides 401-2, 412-2 and 410.

Figure 5:
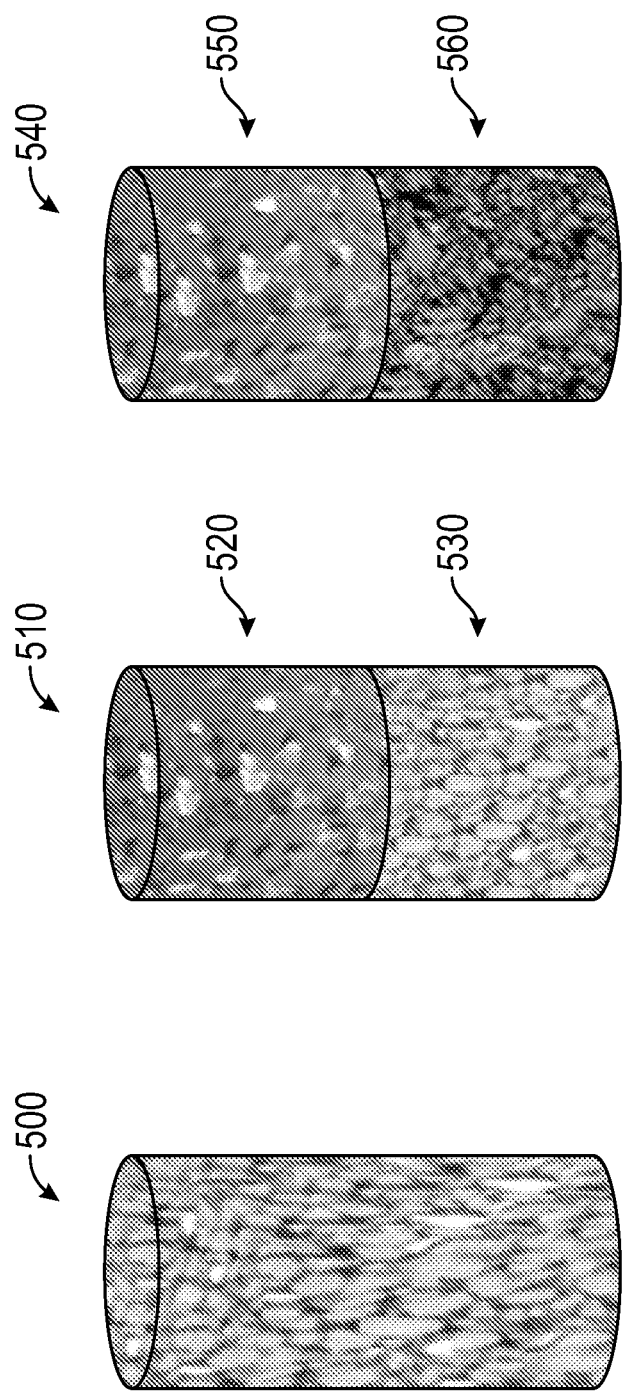
FIG. 5 illustrates an example of predictive rock type cores and actual rock type core in accordance with one or more implementations of the present disclosure.

FIG. 5 illustrates an example of a predictive rock type core and actual rock type core in accordance with one or more implementations of the present disclosure. When applied to coring prediction, the subject disclosure may be used to assess the rock types that would be encountered when the subterranean formation is drilled.

As shown in FIG. 5, a vertical a priori well A (e.g., core 500) exists but based on an applied simulation, as an example, the core from a newly drilled well B may be predicted (e.g., core 510) using rock property tensor information from the core 500. The core 500 may be an actual core sample obtained from a previously drilled well A. The core 510 may be a pseudo core determined using a rock type predictive model. Adjustments may be made to the earth model (e.g., core 510) based on real-time drilling information (e.g., core 540) should any discrepancy be detected. The core 540 may be an actual core obtained from the newly-drilled well B.

A discrepancy in the appearance between the core 510 and the core 540 implies that an update to the rock type distribution in the earth model is needed. In one or more implementations, the predictive model may be calibrated to improve the accuracy of the model. For example, certain discrepancies may be determined during an operational flow, in which corresponding corrections to the model may be needed. In some examples, a cell face may be linked to an image with an incorrect rock property type or to an image with an incorrect orientation. In this regard, the calibration may update the predictive model such that the cell face links to an image with a correct rock property type or to an image with a correct orientation.

Figure 6:
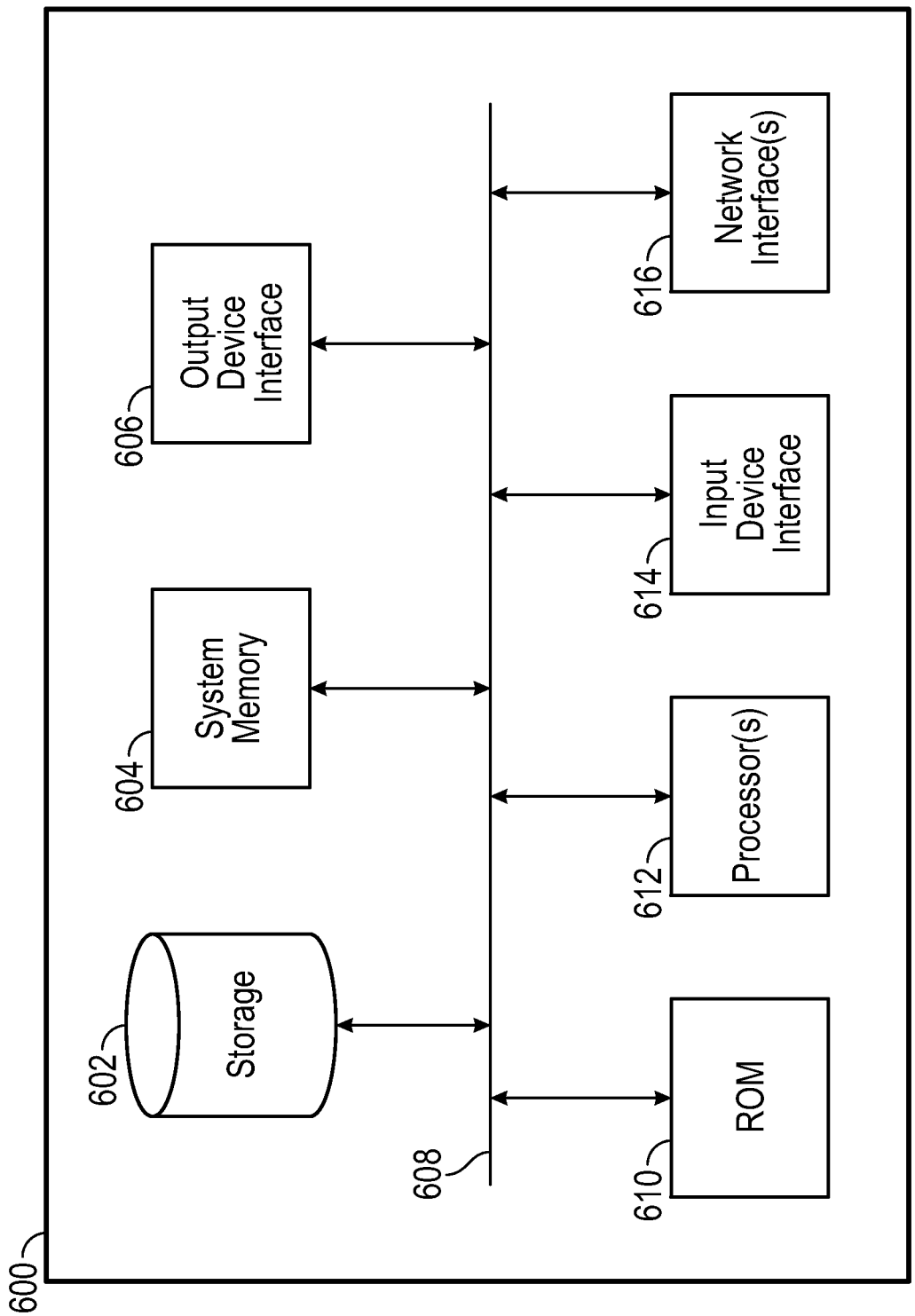
FIG. 6 conceptually illustrates an electronic system with which one or more implementations of the present disclosure may be implemented.

FIG. 6 conceptually illustrates an electronic system 600 with which one or more implementations of the present disclosure may be implemented. The electronic system 600, for example, may be coupled to, a sensor system, a desktop computer, a laptop computer, a tablet computer, a server, a receiver, or generally any electronic device that receives and transmits signals over a network. The electronic system 600 may be a part of the coring tool 110 or a processor located at the surface. Such an electronic system includes various types of computer readable media and interfaces for various other types of computer readable media. The electronic system 600 includes a bus 608, one or more processor(s) 612, a system memory 604 or buffer, read-only memory (ROM) 610, a permanent storage device 602, an input device interface 614, an output device interface 606, and one or more network interface(s) 616, or subsets and variations thereof.

The bus 608 collectively represents all system, peripheral, and chipset buses that communicatively connect the numerous internal devices of the electronic system 600. In one or more implementations, the bus 608 communicatively connects the one or more processor(s) 612 with the ROM 610, the system memory 604, and the permanent storage device 602. From these various memory units, the one or more processor(s) 612 retrieve instructions to execute and data to process in order to execute the processes of the present disclosure. The one or more processor(s) 612 can be a single processor or a multi-core processor in different implementations.

The ROM 610 stores static data and instructions that are needed by the one or more processor(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processor(s) 612 may need at runtime. In one or more implementations, the processes of the present disclosure are stored in the system memory 604, the permanent storage device 602, and/or the ROM 610. From these various memory units, the one or more processor(s) 612 retrieve instructions to execute and data to process in order to execute the processes of one or more implementations.

The bus 608 also connects to the input device interface 614 and the output device interface 606. The input device interface 614 enables a user to communicate information and select commands to the electronic system 600. Input devices that may be used with the input device interface 614 may include, for example, alphanumeric keyboards and pointing devices. The output device interface 606 may enable, for example, the display of images generated by the electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 608 also may couple the electronic system 600 to one or more networks (not shown), the visualization module, through one or more network interface(s) 616. One or more network interface(s) may include an Ethernet interface, a WiFi interface, or generally any interface for connecting to a network. In this manner, the electronic system 600 can be a part of one or more networks of computers (such as a local area network ("LAN"), a wide area network ("WAN"), or an Intranet, or a network of networks, such as the Internet. Any or all components of the electronic system 600 can be used in conjunction with the present disclosure.

The electronic system 600 is suitable for collecting, processing and displaying a multi-dimensional visualization of rock type properties. In one or more implementations, a user can interact with the electronic system 600 via the input device interface 614 to send one or more commands to the system 100 to adjust its operation in response to received logging data. In one or more implementations, the downhole tool is coupled to the processor 612 via the bus 608 to enable the electronic system 600 to communicate with the system 100 including the coring tool 110. In accordance with user input received via the input device interface 614 and program instructions from the system memory 604 and/or the ROM 610, the processor 612 processes the received telemetry information received via the network interface 616 over the bus 608. The processor 612 can construct formation property logs (including one or more geocellular grid images), and display them to the user via the output device interface 606.

Executable sequences described herein can be implemented with one or more sequences of code (software) contained in a memory. In some embodiments, such code can be read into the memory from another machine-readable medium. Execution of the sequences of instructions contained in memory can cause a processor to perform the process steps to analyze the measurements described herein. One or more processors in a multi-processing arrangement can also be employed to execute instruction sequences in memory. In addition, hard-wired circuitry can be used in place of or in combination with software instructions to implement various embodiments described herein. Thus, the present embodiments are not limited to any specific combination of hardware and/or software.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

A processor may include a portion of computer hardware used to implement the various illustrative blocks, modules, elements, components, methods, and algorithms for visualizing the 3D geocellular model described herein. The processor may be configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMs, DVDs, or any other like suitable storage device or medium.

As used herein, a machine-readable medium will refer to any medium that directly or indirectly provides instructions to the processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

To facilitate a better understanding of the present disclosure, the following examples of preferred or representative embodiments are given. In no way should the following examples be read to limit, or to define, the scope of the disclosure.

Embodiments disclosed herein include:

A. A system including a visualization module configured to capture a set of images of a core sample from a subterranean formation, each image of the set of images comprising a representation of at least a cross-section of the core sample; determine a three-dimensional (3D) geocellular model characterization for depicting one or more rock types within the formation; determine that one or more cells of the 3D geocellular model are visible to a field of view for a viewing user; for each of the one or more cells determined to be visible: determine a rock type for the cell; determine that one or more faces of the cell are visible to the field of view; for each of the one or more faces determined to be visible, determine an orientation of the face;

determine that an image of the set of images corresponds to the determined orientation and determined rock type for the cell; and apply the image to the face of the cell in the 3D geocellular model.

B. A method including determining a three-dimensional (3D) geocellular model characterization for illustrating one or more rock types within a formation; determining that one or more cells of the 3D geocellular model are visible to a field of view for a viewing user; for each of the one or more cells determined to be visible: determining a rock type for the cell; determining that one or more faces of the cell are visible to the field of view; for each of the one or more faces determined to be visible, determining an orientation of the face;

determining that an image of a set of images corresponds to the determined orientation and determined rock type, the image comprising a representation of at least a cross-section of a core sample extracted from the formation; and applying the image to the face of the cell in the 3D geocellular model.

C. A non-transitory computer-readable medium comprising instructions that, when executed by a computer, cause the computer to: determine a three-dimensional (3D) geocellular model characterization for visualizing one or more rock types within a formation; determine that one or more cells of the 3D geocellular model are visible to a field of view for a viewing user; for each of the one or more cells determined to be visible: determine a rock type for the cell; determine that one or more faces of the cell are visible to the field of view; for each of the one or more faces determined to be visible, determine an orientation of the face; determine that an image of a set of images corresponds to the determined orientation and determined rock type for the cell, the image comprising a representation of at least a cross-section of a core sample extracted from the formation; and apply the image to the face of the cell in the 3D geocellular model.

Embodiment A may have one or more of the following additional elements in any combination: Element 1: wherein at least a cross-section of the core sample is represented as a computerized tomography image; Element 2: wherein each cell of the 3D geocellular model refers to a corresponding location within a borehole; Element 3: wherein each face of each cell of the 3D geocellular model has a same orientation as that of a corresponding portion in the formation; Element 4: wherein the visualization module is configured to: obtain first image data relating to one or more layers of a first core obtained from a borehole; determine a predictive model for a pseudo core using the 3D geocellular model with the first image data; obtain second image data relating to one or more layers of a second core obtained from the borehole; determine one or more differences between the pseudo core and the second core; and modify the 3D geocellular model based on the determined one or more differences for calibrating the predictive model; Element 5: wherein the visualization module is configured to: determine that at least one cell of the one or more cells has at least one visible face, the determined at least one cell being characterized as a visible cell; Element 6: wherein the visualization module is configured to determine a direction that the face corresponds to on the cell for determining the orientation of the face; Element 7: wherein the visualization module is configured to index a data structure containing a document for each rock type of a plurality of rock types, the document having orientation information for one or more images of the set of images associated with the rock type; Element 8: wherein the visualization module is configured to determine a match in a comparison between the determined orientation of the face and the orientation information of the document, the image being applied to the face in response to the determined match.

Embodiment B may have one or more of the following additional elements in any combination: Element 9: further comprising: obtaining tomography data associated with an extraction of the core sample from a borehole; and determining one or more coordinates of the core sample within the borehole based on extraction orientation data, wherein the 3D geocellular model is determined with the one or more cells corresponding to the determined one or more coordinates; Element 10: further comprising: obtaining first image data relating to a first core obtained from the borehole; determining a predictive model for a pseudo core using the 3D geocellular model with the first image data; obtaining second image data relating to a second core obtained from the borehole; determining one or more differences between the pseudo core and the second core; and modifying the 3D geocellular model based on the determined one or more differences for calibrating the predictive model; Element 11: wherein determining that the one or more cells of the 3D geocellular model are visible comprises: determining one or more coordinates of the 3D geocellular model which are located within the field of view for the viewing user; and determining that at least one cell of the one or more cells has at least one face corresponding to the one or more coordinates, the determined at least one cell being characterized as a visible cell; Element 12: wherein determining the orientation of the face comprises determining a direction that the face corresponds to on the cell; Element 13: wherein determining that the image of the set of images corresponds to the determined orientation and the determined rock type comprises indexing a data structure containing a document for each rock type of a plurality of rock types, the document having orientation information for one or more images of the set of images associated with the rock type; Element 14: wherein the orientation information includes x-axis orientation, y-axis orientation and z-axis orientation for each of the one or more images; Element 15: wherein determining that the image of the set of images corresponds to the determined orientation and the determined rock type comprises determining a match in a comparison between the determined orientation of the face and the orientation information of the document, the image being applied to the face in response to the determined match; Element 16: further comprising: obtaining image data of the core sample in layers, each of the layers comprising a cross-sectional view of the core sample; storing the image data in an image repository by rock type; and loading the image data into a data structure which represents a mapping of images to the 3D geocellular model; Element 17: further comprising: initializing a cell counter associated with the 3D geocellular model; and incrementing the cell counter after the image is applied or after at least one of the one or more cells of the 3D geocellular model is determined not to be visible.

By way of non-limiting example, embodiment A may be combined with: Elements 8 and 9; etc.

Further, by way of non-limiting example, embodiment B may be combined with: Elements 11 and 12; Elements 15 and 16; Elements 15 and 17; etc.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a"

or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A system, comprising: a visualization module configured to:
    capture first image data including a set of images of a first core sample from a first location in a subterranean formation, each image of the set of images comprising a representation of at least a cross-section of the first core sample;
    determine a three-dimensional (3D) geocellular model characterization for depicting one or more rock types within the subterranean formation, the 3D geocellular model including cells representing the first location in the subterranean formation and a pseudo core including cells representing a second location in the subterranean location remote from the first location in the subterranean location;
    predict a rock type expected to be present at the second location with a predictive model for the pseudo core using the 3D geocellular model and the first image data;
    determine that one or more cells of the pseudo core that represent the second location are visible to a field of view for a viewing user;
    for each of the one or more cells of the pseudo core determined to be visible:
        determine a rock type for the cell using the first image data;
        determine that one or more faces of the cell are visible to the field of view;
        for each of the one or more faces determined to be visible, determine an orientation of the visible face;
        determine that an image of the set of images of the first core sample from a database corresponds to the determined orientation of the visible face and determined rock type for the cell; and
        apply the image that corresponds to the determined orientation of the visible face and determined rock type for the cell to the visible face of the cell in the pseudo core;
    obtain second image data relating to one or more layers of a second core sample obtained from the second location in the subterranean formation;
    visually compare the texture and orientation of second image data of the second core sample obtained from the formation to the texture and orientation of images applied to the visible faces of the cells in the pseudo core to determine one or more differences between a predicted visual appearance of the pseudo core and an actual visual appearance of the second core sample; and
    modify the pseudo core of the 3D geocellular model based on the determined one or more differences of the visual appearances, wherein modifying the pseudo core includes determining that the predictive model has linked a particular cell face in the 3D geocellular model to an image with an incorrect rock type or orientation and subsequently calibrating the predictive model such that the predictive model links to a new image with a correct rock property or orientation, and applying the correct rock type corresponding to the second core sample to the pseudo core representing cells at the second location in the geocellular model.

2. The system of claim 1, wherein the representation of at least the cross-section of the first core sample is represented as a computerized tomography image.

3. The system of claim 1, wherein each cell of the 3D geocellular model refers to a corresponding location within a borehole.

4. The system of claim 1, wherein each face of each cell of the 3D geocellular model has a same orientation as that of a corresponding portion in the formation.

5. The system of claim 1, wherein the visualization module is configured to: determine that at least one cell of the one or more cells has at least one visible face, the determined at least one cell being characterized as a visible cell.

6. The system of claim 1, wherein the visualization module is configured to determine a direction that the visible face corresponds to the cell for determining the orientation of the visible face.

7. The system of claim 1, wherein the visualization module is configured to index a data structure containing a document for each rock type of a plurality of rock types, the document having orientation information for one or more images of the set of images associated with the rock type.

8. The system of claim 7, wherein the visualization module is configured to determine a match in a comparison between the determined orientation of the visible face and the orientation information of the document, the image being applied to the visible face in response to the determined match.

9. A method, comprising:
    determining a three-dimensional (3D) geocellular model characterization for illustrating one or more rock types within a subterranean formation, the 3D geocellular model including cells representing a first location in the subterranean formation and a pseudo core including cells representing a second location in the subterranean location remote from the first location in the subterranean location;
    predicting a rock type expected to be present at the second location with a predictive model for the pseudo core using the 3D geocellular model and first image data of a first core sample obtained from the first location;
    determining that one or more cells of the pseudo core in the 3D geocellular model are visible to a field of view for a viewing user;
    for each of the one or more cells of the pseudo core determined to be visible:

determining a rock type for the cell using the first image data;

determining that one or more faces of the cell are visible to the field of view;

for each of the one or more faces determined to be visible, determining an orientation of the visible face;

determining that an image of a set of images from a database corresponds to the determined orientation of the visible face and determined rock type for the cell, the image comprising a representation of at least a cross-section of the first core sample obtained from the formation at the first location; and applying the image that corresponds to the determined orientation of the visible face and determined rock type for the cell to the visible face of the cell in the pseudo core in the 3D geocellular model;

obtaining image data relating to a second core sample obtained from the formation at the second location;

determining one or more differences between a visual appearance of the pseudo core and an actual visual appearance of the second core sample by visually comparing the texture and orientation of second image data of the second core sample obtained from the formation to the texture and orientation of images applied to the visible faces of the cells in the pseudo core in the 3D geocellular model; and modifying the pseudo core in the 3D geocellular model based on the determined one or more differences of the visual appearances, wherein modifying the pseudo core includes determining that the predictive model has linked a particular cell face in the 3D geocellular model to an image with an incorrect rock type or orientation and subsequently calibrating the predictive model such that the predictive model links to a new image with a correct rock property or orientation, and applying the correct rock type corresponding to the second core sample to the pseudo core representing cells at the second location in the 3D geocellular model.

10. The method of claim 9, further comprising:
obtaining tomography data associated with an extraction of the first core sample from a borehole; and
determining one or more coordinates of the first core sample within the borehole based on extraction orientation data, wherein the 3D geocellular model is determined with the one or more cells corresponding to the determined one or more coordinates.

11. The method of claim 9, wherein determining that the one or more cells of the 3D geocellular model are visible comprises:
determining one or more coordinates of the 3D geocellular model which are located within the field of view for the viewing user; and
determining that at least one cell of the one or more cells has at least one visible face corresponding to the one or more coordinates, the determined at least one cell being characterized as a visible cell.

12. The method of claim 9, wherein determining the orientation of the visible face comprises determining a direction that the face corresponds to on the cell.

13. The method of claim 9, wherein determining that the image of the set of images corresponds to the determined orientation and the determined rock type comprises indexing a data structure containing a document for each rock type of a plurality of rock types, the document having orientation information for one or more images of the set of images associated with the rock type.

14. The method of claim 13, wherein the orientation information includes x-axis orientation, y-axis orientation and z-axis orientation for each of the one or more images.

15. The method of claim 13, wherein determining that the image of the set of images corresponds to the determined orientation and the determined rock type comprises determining a match in a comparison between the determined orientation of the visible face and the orientation information of the document, the image being applied to the visible face in response to the determined match.

16. The method of claim 9, further comprising:
obtaining image data of the first core sample in layers, each of the layers comprising a cross-sectional view of the first core sample;
storing the image data in an image repository by rock type; and
loading the image data of the first core sample into a data structure which represents a mapping of images to the 3D geocellular model.

17. The method of claim 9, further comprising:
initializing a cell counter associated with the 3D geocellular model; and incrementing the cell counter after the image is applied or after at least one of the one or more cells of the 3D geocellular model is determined not to be visible.

18. A non-transitory computer-readable medium comprising instructions that, when executed by a computer, cause the computer to:
determine a three-dimensional (3D) geocellular model characterization for visualizing one or more rock types within a subterranean formation, the 3D geocellular model including cells representing a first location in the subterranean formation and a pseudo core including cells representing a second location in the subterranean location remote from the first location in the subterranean location;

predict a rock type expected to be present at the second location with a predictive model for the pseudo core using the 3D geocellular model and first image data of a first core sample obtained from the first location;

determine that one or more cells of the pseudo core in the 3D geocellular model are visible to a field of view for a viewing user;

for each of the one or more cells of the pseudo core determined to be visible:
determine a rock type for the cell using the first image data;
determine that one or more faces of the cell are visible to the field of view;
for each of the one or more faces determined to be visible, determine an orientation of the visible face;
determine that an image of a set of images from a database corresponds to the determined orientation of the visible face and determined rock type for the cell, the image comprising a representation of at least a cross-section of the first core sample obtained from the formation at the first location; and
apply the image that corresponds to the determined orientation of the visible face and determined rock type for the cell to the visible face of the cell in the pseudo core of the 3D geocellular model;

obtain image data relating to a second core sample obtained from the formation at the second location;

visually compare the texture and orientation of second image data of the second core sample obtained from the formation to the texture and orientation of images applied to the visible faces of the cells in the pseudo core in the 3D geocellular model to determine one or more differences between a appearance visual appearance of the pseudo core and an actual visual appearance of the second core sample; and modify the pseudo core in the 3D geocellular model based on the determined one or more differences of the visual appearances, wherein modifying the pseudo core includes determining that the predictive model has linked a particular cell face in the 3D geocellular model to an image with an incorrect rock type or orientation and subsequently calibrating the predictive model such that the predictive model links to a new image with a correct rock property or orientation, and applying the correct rock type corresponding to the second core sample to the pseudo core representing cells at the second location in the 3D geocellular model.

* * * * *